United States Patent
Sheehan et al.

(10) Patent No.: US 7,328,179 B2
(45) Date of Patent: Feb. 5, 2008

(54) SYSTEM FOR DETERMINING A USEFUL LIFE OF CORE DEPOSITS AND INTEREST RATE SENSITIVITY THEREOF

(75) Inventors: Richard G. Sheehan, South Bend, IN (US); William J. McGuire, Scottsdale, AZ (US)

(73) Assignee: McGuire Performance Solutions, Inc., Scottsdale, AZ (US)

( * ) Notice: Subject to any disclaimer, the term of this patent is extended or adjusted under 35 U.S.C. 154(b) by 1498 days.

(21) Appl. No.: 09/726,346

(22) Filed: Dec. 1, 2000

(65) Prior Publication Data

US 2002/0069147 A1   Jun. 6, 2002

(51) Int. Cl.
*G06Q 40/00* (2006.01)

(52) U.S. Cl. .......................... 705/35; 705/10; 705/30; 705/36 R; 705/38

(58) Field of Classification Search .................. 705/35, 705/36, 37, 36 R, 38, 10, 30
See application file for complete search history.

(56) References Cited

U.S. PATENT DOCUMENTS

| | | | | |
|---|---|---|---|---|
| 5,875,437 | A * | 2/1999 | Atkins | 705/40 |
| 6,336,102 | B1 * | 1/2002 | Luskin et al. | 705/35 |
| 6,363,360 | B1 * | 3/2002 | Madden | 705/37 |
| 2002/0069147 | A1 * | 6/2002 | Sheehan et al. | 705/35 |

FOREIGN PATENT DOCUMENTS

WO  WO 00/67169  * 11/2000

OTHER PUBLICATIONS

McGuire, William J. Massengill, Skip J., Comprehensive Asset/Liability Management; More Than Just A Model, Bank Accounting & Finance. Boston: Winter 1996/1997. vol. 10, Iss. 2; p. 21, 9 pgs.*

Sheehan, Richard, Valuing Core Deposits, Apr. 2004, University of Notre Dame.*

* cited by examiner

*Primary Examiner*—Hani M. Kazimi
*Assistant Examiner*—Stefano Karmis
(74) *Attorney, Agent, or Firm*—DLA Piper US LLP

(57) ABSTRACT

A method and system for determining a useful life of financial instruments, such as financial assets and liabilities. A dynamic calculation of a first retention rate is performed for each of several financial assets; a steady-state calculation of a second retention rate is performed for the financial assets; and the first and second retention rates are combined to determine a predicted useful life of the combined financial assets.

Optionally, one of several variables affecting at least one of the retention rates is selected. A sensitivity of financial asset variables to other financial asset variables is determined. Scenarios are forecast, extrapolated from the retention rate. The financial assets may include deposits and/or financial instruments. Outliers in the financial assets may be checked, in one variation of the invention. Exogenous variables may be included in at least one of the calculations. The exogenous variables are selected from the set including seasonal variables, day-of-the-month variables, treasury interest rates, deposit rates, local unemployment rate, local personal income, and local retail sales, and the like. Interest rate spread may be included in at least one of the calculations. Forecast scenarios may include future values for use in at least one of the calculations. The future values may be selected from the set including forecast treasure rates, forecast horizon, forecast deposits, forecast retention rates, and forecast interest rates, and the like.

33 Claims, 5 Drawing Sheets

SYSTEM FOR DETERMINING A USEFUL LIFE OF CORE DEPOSITS AND INTEREST RATE SENSITIVITY THEREOF

BACKGROUND OF THE INVENTION

1. Field of the Invention

The invention generally relates to financial forecasting and planning. More particularly, it concerns estimating the expected life of deposits, especially core deposits (a/k/a non-maturity deposits), at a financial institution, to ascertain the sensitivity of deposits to changes in variables determined outside the financial institution such as interest rate changes, and to forecast the behavior of deposits.

2. Description of the Related Art

Financial institutions take in different types of deposits and pay interest on those deposits while simultaneously purchasing assets and receiving interest on those assets. The profitability of a financial institution depends on its ability to earn higher interest rates on its assets than it pays for its deposits.

Generally, the longer the maturity of an asset the higher the interest rate paid on it. This creates a performance incentive for financial institution managers to buy longer maturity assets. Funding longer maturity assets with retail deposits presents special challenges, though. This is because balances in some types of deposits—so called "core deposits" (a/k/a non-maturity deposits) including categories such as NOW (Negotiable Order of Withdrawal), savings, checking and MMDA (money market demand accounts), are eligible to be withdrawn from the institution actually or virtually upon demand. If such deposits are used to buy longer maturity assets, a potentially serious asset and liability maturity mis-match is apparently created.

In fact, however, a substantial fraction of core deposits tend to stay in an institution for a period measured in years rather than in days or weeks. Thus, financial institutions can and do in a probabilistic sense use these deposits to fund purchases of long-term assets. However, such purchases are fraught with uncertainty given the unknown true maturity of the underlying deposits.

There have been three major types of efforts aimed at resolving the problem of determining the expected life of core deposits as well as numerous attempts to address parts of the problem. Possibly the earliest efforts involve regulators including the Office of Thrift Supervision (OTS), the Office of the Comptroller of the Currency (OCC) and the Federal Reserve (Fed). All these regulatory bodies have, at least in part in the interests of simplicity and fairness, adopted a "one size fits all" approach to considering the probabilistic withdrawal of core deposits.

The Fed has made its conclusions the most explicit of the three. For example, see David M. Wright and James V. Houpt, "An Analysis of Commercial Bank Exposure to Interest Rate Risk," *Federal Reserve Bulletin*, (February 1996, pp. 115-28).

In contrast, the OTS has been the most secretive about its internal process which is essentially a black box to those outside the OTS, although notes released and Fed publications indicate that OTS and Fed procedures are very similar. The Fed's published work indicates that it has examined a cross-section of financial institutions and has estimated the average lives of all types of core deposits to be very short, typically less than five years, with checking accounts in particular having a life of approximately one year.

There are two problems with the approach of these regulatory bodies. First, they have been exceptionally conservative in their estimates of deposit lives, a finding not the least surprising given their regulatory roles. Setting short lives for core deposits increases the probability that a financial institution will not experience financial distress from excessive asset-liability maturity mismatch and thus cause problems for the regulator. The fact that this constraint may have major implications for profitability is not typically considered. Second, they have set an average life for a particular type of core deposit that does not vary across institutions. This unfortunately fails to address the issue that the different clienteles served in, say, a retirement community in Florida versus a suburb of Las Vegas, might cause dramatic differences in the behavior of deposits in those different local institutions.

The second general type of effort has been in the academic literature. An article by Richard G. Anderson, E. Jayne McCarthy and Leslie A. Patten, "Valuing the Core Deposits of Financial Institutions: A Statistical Analysis" in the *Journal of Bank Research* (vol. 17 #1, 1986, pp. 9-17) is perhaps the most complete and explicit statement of the process. Anderson et al. proposes sampling accounts at one institution on a yearly basis and then calculating what fraction of accounts remain with the institution from one to fifteen years later. The results in part address one limitation of the regulators' approach in that they consider only one institution rather than taking a cross-section of institutions at a point in time. The approach is to sample accounts at year-end and then consider the percentage of accounts remaining with the institution at year-end in subsequent years. The ratio of accounts (by account age) and the retention rate of accounts are calculated. This retention rate is then employed to estimate the economic value of the core accounts.

Nevertheless, this account sampling approach fails in at least two dimensions. First, it considers the number of accounts rather than the volume of funds in accounts. If larger accounts tend to remain with an institution while small accounts are more likely to be closed, this approach would seriously understate the value of a $1 in deposits. Second, there is no attempt to relate the retention rate to economic conditions, including interest rates or interest rate spreads. Anderson et al. fail to consider that both the number of accounts and the total balances of those accounts are related to interest rate differentials. For example, Anderson et al. do not take into account that, as an institution raises its rate relative to market rates, there might be a higher retention rate for deposits in retained accounts.

The third type of effort has been in the consulting area and is principally expressed in two publications. The first is by Z. Christopher Mercer, *Valuing Financial Institutions* (Homewood, Ill: Business One Irwin, 1992). In Chapter 19, "Branch Valuations and Core Deposit Appraisals," Mercer presents what is likely the most explicit statement of the process of valuing core deposits. (In particular, consider Exhibits 19-3 through 19-8.) The methodology, however, is fundamentally the same as that in Anderson, et al. mentioned above and is subject to the same limitations.

The other statement of approach, labeled the Commerce Methodology, is briefly described in the *American Banker*, (May 3, 1996), *N.J.'s Commerce Using High-Power Method to Evaluate Deposits* and examined in more detail in Chapters 7 and 8 of *Interest Rate Risk Models: Theory and Practice*, by Anthony Cornyn and Elizabeth Mays (Editors), Glenlake Publishers, Chicago, London, New Dehli: 1997. That approach, developed by William J. McGuire and Richard G. Sheehan, the inventors, rectifies many of the difficulties with the approaches mentioned above. There initially is a survey of deposits, as with Anderson, et al. and Mercer, and that survey focuses on the total balances in the survey accounts. Those balances are then related to market rates including Treasury rates using regression analysis. The regressions yield simple linear relations between Treasury rates and prior retention rates. These linear relations then are employed to forecast retention rates for any time horizon and serve as the basis for valuing core deposits. The Commerce Methodology represents a dramatic improvement over all prior methodologies and has been subsequently employed for a number of financial institutions.

However, even the Commerce Methodology has limitations, in particular concerning the statistical specifications implicit in the methodology. That is, when retention rates are linked to other variables including Treasury rates, there remains a question concerning exactly which variables are to be included in the equation and how sensitive the results are to the particular equation employed or to the particular regression estimated. In addition, as with all conventional methodologies, the process of calculating the forecasted retention rates and their values is potentially dependent on the last few observations in the sample. That is, deposits are sampled monthly and if the last month indicates a sharp downturn in deposits, even though there may have been limited declines elsewhere in, say, a 48 month sample, the forecast may place more emphasis on that last month and to project that such a decline will become the norm in the forecasted period. The Commerce Methodology also has the deficiency as with prior methodologies that it restricts the relationships between variables influencing retention rates to be linear. There is no reason, however, why Treasury rate changes, for example, would necessarily influence a financial institution's deposits in a strict linear fashion. Finally, the Commerce Methodology does not allow asymmetries in relationships. That is, an increase in deposit rates and a decrease in deposit rates are treated as though they have the same impact (with the sign reversed) on the level of deposits. That procedure does not accommodate a case such as when a depositor may choose to keep deposits in an institution with a rate increase but may choose to leave with a rate decrease, for example.

SUMMARY OF THE INVENTION

It is an object of the present invention to provide a system that more accurately determines the expected lifetime and the expected value of a financial institution's core deposits. It is another object of the present invention to allow financial institutions greater flexibility in the assets purchased using core deposits, possibly funding purchases of longer term and higher yield assets.

Another object of the invention is to provide a system to determine the interest rate sensitivity of core deposits. Another object of the invention is to allow a financial institution to predict how interest rate changes will influence core deposits' expected lifetime and this value to the institution.

Another object of the invention is to precisely and accurately forecast the retention rates of core deposits, the financial institution's interest rates, and the financial institution's total deposit balances all in the context of a single unified model.

Another object is to provide a method of forecasting the expected life of core deposits, thereby to allow the financial institution to obtain the correct—and in many cases likely the longest possible—assets to match with the deposit base.

Another object is as factors such as interest rates change, to forecast how deposits will change, thereby to permit the financial institution to determine how much risk to accept by stretching—or not stretching—the lives of assets.

In accordance with these and other objects, there is provided a method and system for determining a useful life of financial assets. In a computerized system, a dynamic calculation of a first retention rate is performed for each of several financial assets. In the computerized system, a steady-state calculation of a second retention rate is performed for the financial assets. The first and second retention rates are combined to determine a predicted useful life of the combined financial assets.

The following are included in preferred embodiments of the invention. Optionally, one of several variables affecting at least one of the retention rates is selected. A sensitivity of financial asset variables to other financial asset variables is determined. Scenarios are forecast, extrapolated from the retention rate.

In preferred embodiments, the financial assets include deposits and/or financial instruments. Data for each of the financial assets includes total deposit balances, deposit rates, and a sample of account balances. Data may be received for each of a the several financial assets. A length of the sample may be about four years. In highly preferred embodiments, the size of the sample may be $n=4k^2s^2/d^2$, and wherein s is an estimated yearly retention rate, d is about in the range of 0.01 to 0.03, and k is a level of significance of about 1.96. Most preferably, d of about 0.03 is used for hand-collected, and 0.01 or 0.015 is used for electronic.

Outliers in the financial assets may be checked, in one variation of the invention.

In further variations of the invention, exogenous variables may be included in at least one of the calculations. The exogenous variables are selected from the set including seasonal variables, day-of-the-month variables, treasury interest rates, deposit rates, local unemployment rate, local personal income, and local retail sales, and the like.

In another variation of the invention, interest rate spread may be included in at least one of the calculations.

In yet another embodiment, forecast scenarios may include future values for use in at least one of the calculations. The future values may be selected from the set including forecast treasure rates, forecast horizon, forecast deposits, forecast retention rates, and forecast interest rates, and the like.

In another embodiment, the predicted useful life of the combined financial assets may be output, such as on a display.

BRIEF DESCRIPTION OF THE DRAWINGS

The invention is described in connection with the drawings.

DETAILED DESCRIPTION OF THE PREFERRED EMBODIMENT

The invention will be described herein in five parts for ease of understanding, without limitation. The first consists of a process for capturing or receiving initial data from a financial institution and putting the initial data in a predetermined format for use in subsequent processes. The second involves a process for selection of variables that influence retention rates in particular as well as total deposit balances and the institution's interest rates. The third involves alternatives allowed to the basic process described in the second part. That is, there is a basic approach to the estimation process but there are a number of alternatives that a financial institution can choose depending on the use of the forecasts. The fourth part is the actual forecasting process itself which is based on the estimation described in steps two and three. The forecasting process also allows an institution a number of alternatives depending on the use of the forecasts. Finally, the fifth step involves taking the results from the forecasting equation and using them in particular business applications, in particular, calculating the value of core deposits and their sensitivity to factors such as interest rate changes. The rest of this section describes each of these parts in more detail.

Part One

Figure 1:
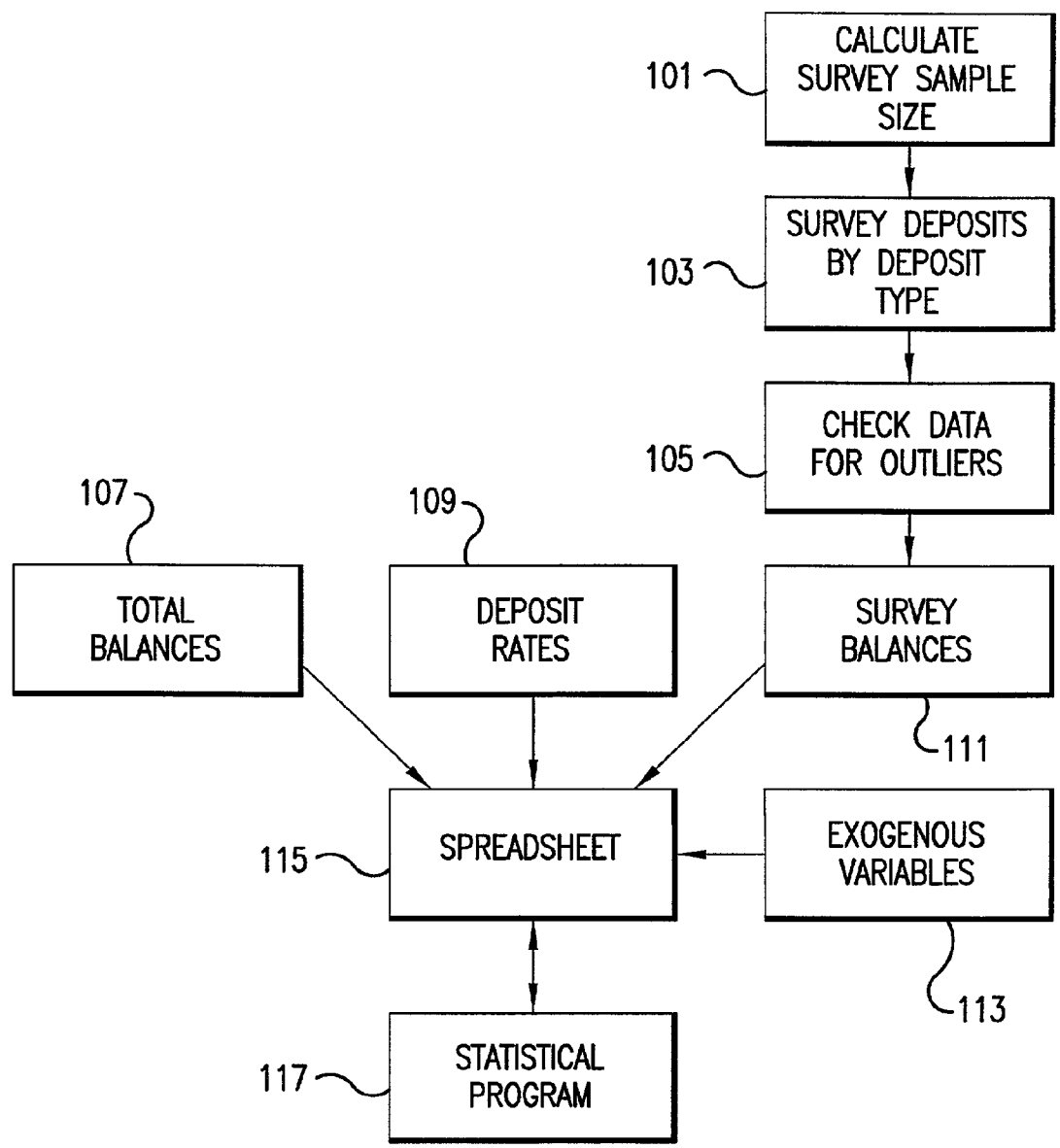
FIG. 1 is a block diagram illustrating data assembly.

Reference is made to FIG. 1. Data is obtained from a financial institution, typically on three types of variables: (1) the institution's total deposit balances by type of deposit for a varying number of categories of deposits 107, (2) the institution's deposit rates 109, also by type of deposit for a varying number of categories of rates, and (3) a sample of the institution's individual accounts 103, again by type of deposit for a varying number of categories of accounts. Typically the data is on a monthly basis and will be referred to hereafter as monthly although the general process can be employed on different frequency data, including quarterly, weekly or bi-weekly. The data on the institution's total balances and deposit rates typically do not need—should not need—further adjustment unless different deposit categories are being combined. (That is, the aggregate values are not modified unless the institution needs to combine multiple categories of deposits, for example, regular MMDA deposits and higher-yield MMDA deposits.) The sample of individual accounts, however, often requires additional detail presented below.

A survey sample size is determined 101. On the appropriate length of the data sample, there is no hard statistical rule on what sample time period (length) would be required. The process preferably employs a minimum of four years of monthly data for a minimum of 48 observations. This sample length provides enough information typically to obtain reasonable estimates and forecasts, although longer data samples are desired when available. (The maximum useful length of the data sample generally would be no more than ten years. Longer samples would be problematic due to issues of potentially changing market structures due to financial deregulation and innovation, for example.)

Determining the size of the sample (the number of individual account) requires substantially more attention. How many depositor accounts should be included in the sample? The answer in part depends on how accurate the institution wants the forecast of the retention rate to be. The greater the desired accuracy, the larger the required sample of accounts. The answer also depends on the total pool of open accounts. The greater the number of accounts to sample from, the larger the required sample as well, although the relation between number of accounts and required sample size is highly nonlinear. It is a straightforward exercise in statistics to demonstrate that the appropriate sample size is $n=4k^2s^2/d^2$ where n is the sample size, k is based on the level of significance considered (typically 95% thus yielding a value of k of 1.96), s is the standard deviation of the underlying population of deposit accounts, and d is the desired level of accuracy. (See Anderson, Sweeney and Williams, *Statistics for Business and Economics*, (St. Paul: West Publishing, 1996), for example, for a complete explanation underlying this equation.)

There are, however, three particular features about the process of implementing the formula that are not standard or straightforward in statistics. The first is the selection of a value for s, the standard deviation of the underlying population of accounts. Before selecting the sample, s is unknown and hence an approximation must be input. The process here assumes experience based values for s that vary depending on the type of deposit. Assigning values employs information about the variable ultimately to be forecasted, the retention rate. Considering the retention rate as a probability of retention, the process then is a binomial event in statistics. We then pick a conservative (i.e. low) estimate of the likely retention rate for the type of deposit. For example, for checking accounts, a yearly retention rate of 70 percent should be considered conservative given prior applications. This value implies the appropriate value of s, which is used in the sample size equation.

The second feature is to pick a particular value of d. This component does not have a single statistical requirement. The process lets the financial institution set this value although we normally recommend a value for d in the range of 0.02 to 0.03. Lower values imply more accuracy and thus require a larger sample and higher costs. Thus, the choice of the value of d is dependent on the institution's trade-off of accuracy versus cost.

The third feature of the sample size determination is based on the recognition that data collection costs must be weighed against the benefits of improved accuracy. The above formula for n will yield a sample size in all cases. However, the last step in determining the sample size is simply to check the costs associated with collecting that size sample with the benefits of the accuracy that such a sample size would imply. From a practical perspective, this feature generally caps hand-collected sample sizes at 250-350 since larger samples generally do not yield appreciable improvements in forecast accuracy relative to increased collection costs.

At this point, there is data for the financial institution on total balances 107, deposit rates 109, and survey balances by account 103, all for alternate classes of deposits.

After collecting the survey data, the next step is to check the survey balances for accuracy and for outliers 105. Since the forecasts for retention rates are potentially sensitive to outliers in the data and since the financial institution may have provided hand-collected data subject to errors, it is particularly advantageous to check for outliers. The process for checking for outliers advantageously is two part. Funds deposited in a non-maturity account may remain only overnight or for many years. When an account has a substantial temporary increase (or decrease) in deposits, however, one can reasonably question whether such a change is accurate or whether it has been mis-recorded. For example, in the transcription of account balances, it is possible to have an account with actual balances of, say, $3,456 mis-recorded as $34,566. Alternately, it is possible that the same type of change could be due to a large transitory deposit, for example as a result of selling a piece of property.

Such data entries are first reviewed with the institution to establish the correct entry. In rare cases where the costs of reviewing the data points are too high, a method for resolving which of the two reasons is the true cause underlying any particular outlying observation. The procedure adopted is that when either of two types of anomalies described above occurs, the result is presumed to be a transcription error and the value is changed. The changes are: (1) When the old and new numbers differ by a factor of approximately ten, as above with a "double"—in this case repeated 6—the "double" is presumed to be in error and is removed. (2) When the old and new numbers differ in terms of the decimal, e.g. $123.45 followed by $12,345., the decimal point is presumed to have been inadvertently omitted. Otherwise, values are is presumed to be correct. The second part of the general check for outliers considers individual accounts rather than individual observations. That is, an observation may be "influential" in terms of being a single outlier for one account or an account itself may be unusual relative to the other accounts in the sample. Thus, a large account may be excluded from the sample if it is atypical. The basic procedure employed is that if in a sample of 250 accounts, for example, a single account makes up more than a certain percent of the deposits in the sample, it would be deemed an influential account. (With 250 accounts, the typical account would represent deposits of only 0.4 percent of the sample deposits). This account would typically be deleted from the sample as unrepresentative of the accounts overall in the financial institution. Accounts with more than 5 percent of sample balances are "flagged" and examined, while accounts of that certain percent or more of sample balances typically are excluded. Ten percent is an appropriate percentage in the foregoing basic procedure, although other percentages will work.

This last adjustment is utilized so that the focus of the process is not on one or a few individual accounts in the survey but rather on the total balances of all accounts in the survey. If one account or a few accounts, in fact, were to dominate behavior for a deposit class at a financial institution, then it would be inappropriate to delete the offending account. Note that in all cases, accounts are deleted only with the understanding and acceptance of the institution.

Once the survey deposits have been checked, then the survey balances are aggregated for each account type and for each observation period to obtain the total survey balances by account type by period, referred to hereafter as survey balances 111. At this point, the data available by deposit type and by month consists of the institution's total balances 107, deposit rates 109, and survey balances 111. For further calculations, these variables are preferably in a spreadsheet 115 (e.g., Excel or Lotus) and arranged, for example, with the columns indicating the variables and the rows indicating the appropriate months.

In addition to the variables internal to the institution, there are some external variables or exogenous variables 113 that also must be included in the analysis and thus in the spreadsheet. Those variables include some or all of four general types. The first are simply seasonal and day-of-the-month type variables, so-called binary or "dummy" variables (0/1 values). For example, each month (e.g. January) has a separate identifying variable and each day of the week (e.g. for months ending on a Friday) also has a separate identifier. For example, a variable for Friday would take a value of 0 for all months that do not end on a Friday and would take a value of 1 for all months that end on Friday. The second external type of variable is Treasury interest rates. Three Treasury rates are included, for 90 day bills, for 1 year notes and for 10 year bonds. These three adequately capture most features of the term structure and the overall movement in general interest rate conditions. The third type of external variable is market deposit rates, that is, deposit rates for the typical institution in this financial institution's relevant market. Data may be gathered from a commercially available publication such as *Bank Rate Monitor* (BRM) or may be provided by the institution. These data need to be available for the same period over which the institution's survey balances are available. Finally, additional local market condition descriptors may be entered as external variables. These are included to measure the health of the local or regional economy. These differ in availability across markets but in general include the unemployment rate, personal income and retail sales.

The spreadsheet process 115 to this point simply puts the data in the appropriate format to begin the process of the statistical analysis that leads to the forecasts. The spreadsheet is saved and the spreadsheet then serves as an input, advantageously being incorporated directly into a statistical package such as RATS (Regression Analysis of Time Series).

Part Two

Figure 2:
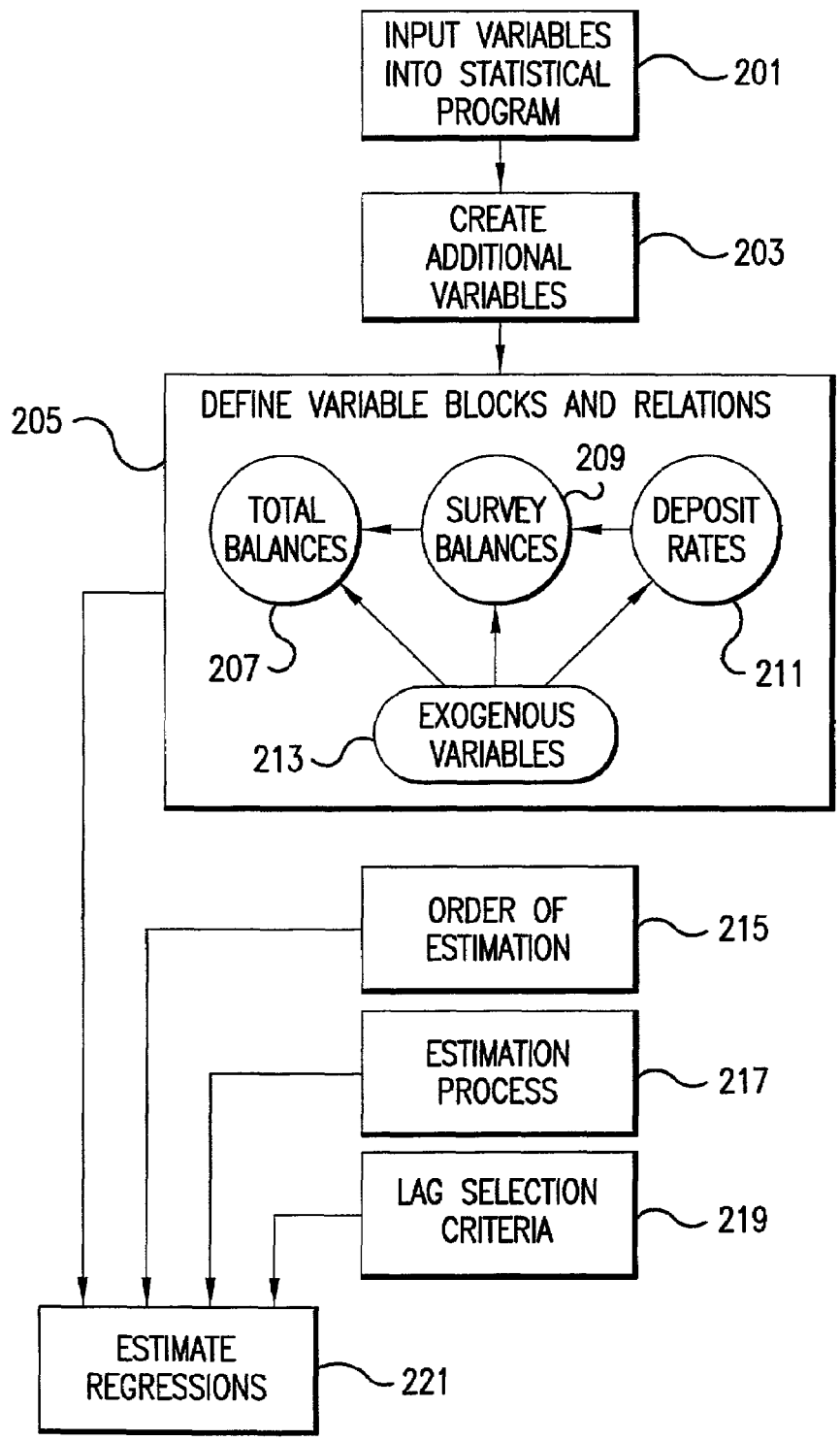
FIG. 2 is a flow chart illustrating basic estimation.

Reference is made to FIG. 2. This part describes exemplary basic statistical procedures employed to obtain equations that are used to forecast variables for the financial institution. The first step in this part is to define some additional variables 203. Specifically, it is assumed that a financial institution's deposits (either total or survey) may be influenced either by the general level of interest rates or by interest rate spreads. The relevant interest rate spreads potentially are of three types: differences between this institution's deposit rates and those in the market, differences between this institution's rates on different types of deposits, and differences between short-term and long-term rates. All three types of spread variables are defined and are potentially included in subsequent analysis although the exact definitions of the spreads are necessarily institution specific. One or more of three types of spreads are included: (1) differences between short-term and long-term rates, e.g. between the 90 day and 1 year Treasury rates and between the 1 year and 10 year Treasury rates, (2) differences between this institution's rate on a particular deposit category and that in its market, e.g. differences between this institution's MMDA rate and the market (e.g., BRM) MMDA rate, and (3) differences between this institution's rates are different deposit categories, e.g., MMDA and NOW rates.

In addition to considering interest rate spreads, the process allows the potential for institution-specific variables that cannot be picked up by economic variables as typically defined. For example, if an institution had a promotion on MMDA accounts from May to July giving free checking if a minimum balance were maintained in an MMDA account, one might suspect that MMDA balances would increase in those months independent of changes in other variables such as interest rates. Thus it would be appropriate to define and include a specific binary variable that assumed a value of 1 during the months of May through July and 0 otherwise. The definition of institution-specific binary variables is determined based on information provided by the financial institution and in consultation with management.

In 205, note that there are a total of four "blocks" of variables, the institution's total balances by account type 207, the institution's survey balances by account type 209, the institution's deposit rates by account type 211 and other exogenous variables 213. The following analysis considers the disposition of variables, and makes some distinctions on the basis of the different "blocks" of variables. The first three blocks of variables are "explained" or related to variables that are either predetermined, that is, are available from prior observation or from a prior period, or are exogenous, that is are determined outside the financial institution.

The process to explain these variables basically uses a modified version of the standard statistical approach of regression analysis or ordinary least squares (OLS), again presented in a statistical text such as Anderson, et al., op. cit. or seemingly unrelated regression (SUR) presented in George G. Judge, William E. Griffiths, R. Carter Hill, and Tsoung-Chao Lee, *The Theory and Practice of Economics*, (New York: Irwin, 1980). With OLS, each variable of the financial institution (in the first three blocks) is sequentially related to lagged or predetermined variables. Thus, if there are a total of five variables in each of the three blocks, there then would be a total of 15 equations estimated with OLS (or SUR). The OLS procedure involves relating a variable at a point in time t, defined as $Y_t$, e.g. checking account balances, to prior values of this variable, denoted $Y_{t-L}$, as well as to prior values—and thus known values—of variables in the other three blocks. These could be denoted as $Y2_{t-L}$. In addition, $Y_t$ also is potentially related to current and to lagged values of the exogenous variables, labeled $X_{t-L}$. Thus, one could consider the equation:

$$Y_t = \alpha_0 + \alpha_1 Y_{t-L} + \alpha_2 Y2_{t-L} + \alpha_3 X_{t-L} \quad (1)$$

where
X=exogenous variable,
Y=variable,
t=time,
L=lag time, and where the values for the parameter $\alpha_i$'s are obtained by regression using a statistical package such as RATS.

In practice, it would be inappropriate to estimate a single equation in isolation. That is, the behavior of checking account balances is likely not independent of the behavior of savings account balances or perhaps savings account deposit rates. Thus, the process here considers a system of equations such as (1), one equation for each category of core deposits to be forecasted. A general system of equations such as (1), when estimated together, is typically called vector autoregressive (VAR) analysis. VAR analysis is a relatively recent introduction in the history of statistics, and its application to forecasting has been growing dramatically. (For example, see Hafer and Sheehan, "The Sensitivity of VAR Forecasts to Alternative Lag Structures," *International Journal of Forecasting* 5 (1989), pp. 399-408 and Robertson and Tallman, "Vector Autoregressions: Forecasting and Reality," *Economic Review*, Federal Reserve Bank of Atlanta, (First Quarter, 1999), pp. 4-18.) VAR procedures have been shown to yield relatively accurate forecasts in a wide range of applications. However, as both these citations note, the application of VAR estimation requires a number of assumptions and those assumptions may critically influence the estimation and forecasting powers of the model. The exemplary process of specifying those assumptions or criteria are spelled out in the following paragraphs in a broad sense. In a number of cases, however, there are reasonable alternatives that are allowable and that are included the process here. Those alternatives are more fully described in Part Three.

The general estimation process 217 adopted here is called VAR analysis. The preferred approach is called subset VAR analysis and has been previously employed in Sheehan, "U.S. Influences on Foreign Monetary Policy," *Journal of Money, Credit and Banking*, 24 (November 1992), pp. 447-64. The logic underlying the use of subset VAR analysis is simple. In a typical application of the process described here, there could be five types of assets, thus 15 endogenous variables—five total balance variables, five survey balance variables and five deposit rate variables. In addition, there typically are over 20 exogenous variables that potentially belong in each estimated equation. If each variable is allowed to enter with only two lags (L=2 in the notation of equation (1)), that would imply a total of 35 different variables with two lags each for a possible total of 70 right-hand side variables. Given that the additional right-hand-side variables in (1) require additional data to obtain reasonably accurate estimates of the parameters or the $\alpha_i$'s in (1)—econometricians would say that each additional variable uses a degree of freedom—the required data sample would have to be substantially longer than 70 periods long. Using monthly data, that would mean a period longer much than six years. However, there is no guarantee that a financial institution would face the same market structure, which appears an unreasonable assumption over a ten or twenty year period given the history of merger activity and financial innovation and deregulation. Thus, a subset VAR is very helpful to reduce the dimensionality of the problem. However, creating a subset VAR necessary entails substantial additional assumptions.

The first part of reducing the dimensionality of the VAR is to determine the criteria whereby variables are to be included or excluded: lag selection criteria 219. A number of statistical criteria are available as described in Hafer and Sheehan, op. cit. The basic criterion preferably employed here is the Bayesian Information Criterion (BIC) which has the property that the selection of variables included is the theoretically correct choice at least asymptotically. (The process allows other criteria to be chosen and that will be discussed below.) Thus, whether a variable is included or excluded from (1) is based on the results of a statistical criterion such as the BIC.

There also is a question of the appropriate lag length, left unspecified in the general context of equation (1). There is no theoretical determination possible of the appropriate lag length, although much has been written on the subject. Here, the approach is to specify the maximum lag length allowed, following Hafer and Sheehan, and then have the BIC criterion determine which of the lags are, in fact, appropriate. The maximum lag length is left open but with monthly data the recommended lag length is two months in most applications. Again, this assumption reduces the dimensionality of the problem and is required by the sample size.

The additional assumptions employed in the VAR order of estimation process 215 are straightforward. There are a total of four blocks of variables as noted above 205, three within the institution and one exogenous. The process constrains relations between the blocks. The blocks can be labeled T for the vector of variables included in total balances, S for the vector of survey balance variables, R for the vector of deposit rates, and X for the vector of exogenous variables. The vector X is assumed to be determined independent of any considerations in the other three vectors. That is, the financial institution does not have any impact on market rates such as Treasury bill rates. The vector S for survey balances is assumed to be potentially influenced by deposit rates but not by total balances. That is, whether an account remains with the institution may depend on the institution's rates but does not depend at least directly on the institution's total deposit balances. The vector T is assumed to be potentially influenced both by deposit rates and by survey balances (and thus retention rates). And the vector R potentially influences both survey and total balances and is potentially influenced by those in turn. That is, the institution may change deposit rates either in response to changing retention rates or in response to changes in total balances.

(The statistical properties of the T, S and R vectors require that changes in T and S influence the levels of R since R typically is an I(0) series while T and S typically are I(1) series. See James D. Hamilton, *Time Series Analysis* (Princeton, N.J., Princeton University Press, 1994) for a complete discussion of the meaning and differences between I(0) and I(1) series).

At the end of Part Two, the process yields the basic estimation equations or estimate regressions 221 based on a subset VAR model that are employed to forecast retention rates in particular but also potentially deposit rates and total balances. Before moving to the forecasting approach, however, it is important to note in this part there was some discussion of potential alternatives that are allowed and there is some flexibility in the estimation process. Part Three goes through alternatives in much more detail, in particular, alternatives that further distinguish this approach from any others employed previously.

Part Three

The prior section describes the basic approach. Within this approach, however, there is substantial flexibility. This section describes four additional areas where alternatives to the standard approach are allowed that potentially generate much improved forecast accuracy or that imply substantially better explanations for why retention rates change, for example.

First, as mentioned in the prior section, there are a number of statistical criteria that could be employed as the basis for choosing lag lengths and included variables. The standard employed here is the BIC. The advantage of that criterion is that it generates asymptotically correct results. The limitation, however, is that in very small samples it may include too few variables.

Figure 3:
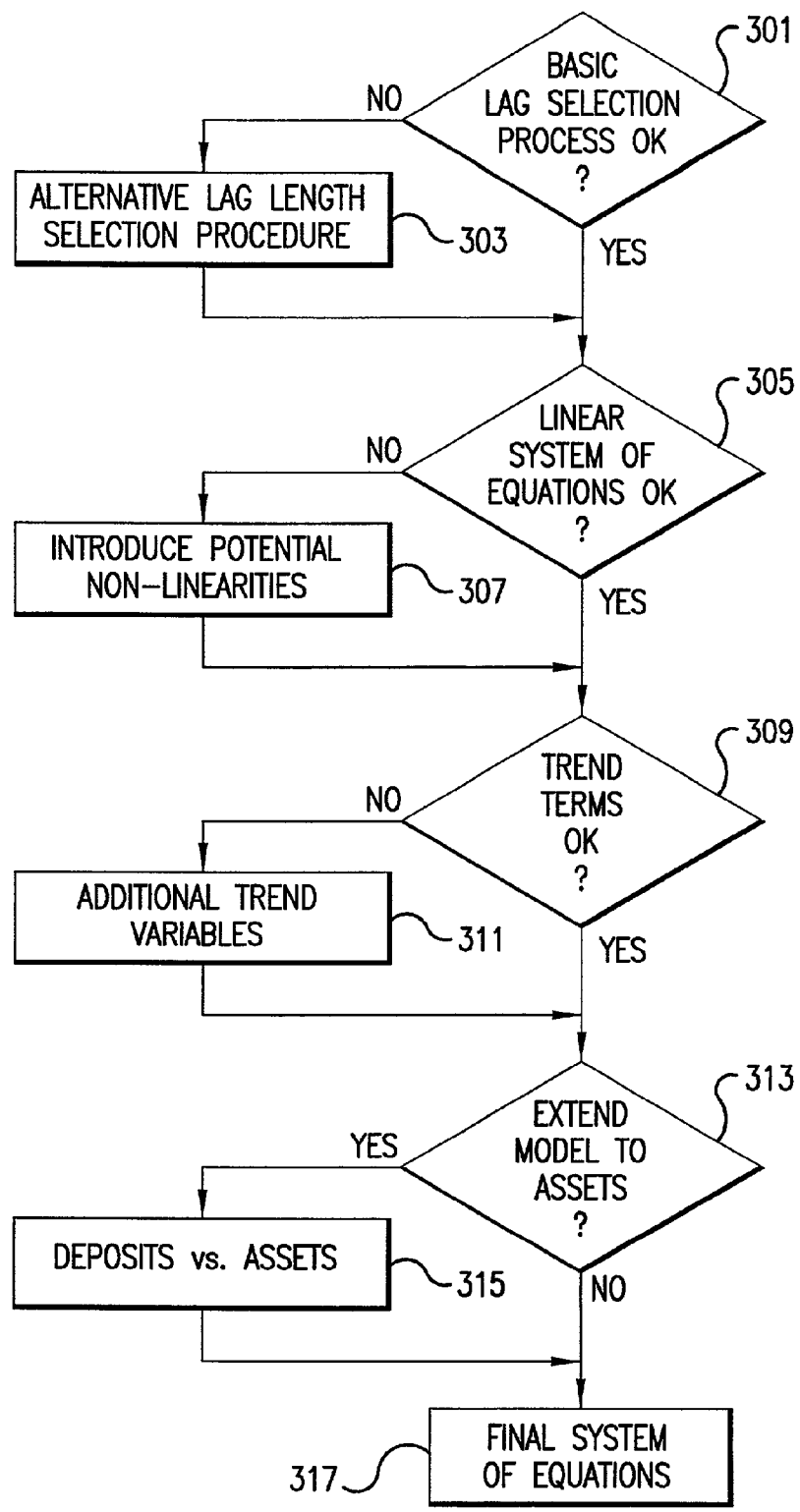
FIG. 3 is a flow chart illustrating estimation alternatives.

Reference is made to FIG. 3. Thus, the financial institution is afforded the alternative 301 of alternative selection criteria 303 such as the Final Prediction Error (FPE) criterion. These additional criteria are presented and discussed in Hafer and Sheehan, op. cit., and their forecasting performance in a macroeconomic setting are discussed in detail there. If an institution wanted to ensure that there were no variables that were falsely excluded from the estimated equation, then the FPE would be a reasonable alternative to the BIC. The cost of such a change, however, would be to potentially include in the equation variables that in fact should not be included.

Second, the typical regression and the typical VAR are linear both in the estimated parameters and in the choice of variables. While OLS requires linearity in the estimated parameters, it does not require linearity in the choice of variables. In the event that a linear system of equations is not satisfactory 305, there are nonlinear options offered 307. The first allows variables to be included either in linear form (the standard) or in logarithmic form. The advantage to using logs is simply that the estimated coefficients, the $\alpha_1$'s in (1) are then interpreted as the estimated elasticities. Thus, this approach yields a quick answer to questions like: if deposit rates rise by 5 percent, what would be the resulting percent change in the level of total deposits? The second nonlinearity allowed considers asymmetric response. That is, when considering the impact of interest rate changes, for example, to date all forecasting models of deposits or retention rates assume that rate increases and decreases have symmetric impacts. Here, the possibility of asymmetric response is allowed with the option of allowing rate increases and decreases to have different impacts on total balances and survey balances.

Third, many economic variables have trends, and total balances at financial institutions are typical in this regard. That is, most healthy financial institutions have trend increases in many if not most deposit categories. The typical regression and VAR estimated to date has employed a simple time trend to capture this effect. (That is, a variable t would be defined as having a value of 1 in the first period, 2 in the second, 3 in the third, etc. and this variable would be included in the list of exogenous variables.) While this approach works well in many cases, it is limited in that it assumes that there is but one trend over the entire period. For example, if the estimation period runs from 1995:1 through 1999:12, including a simple trend would require the same change in deposits for each period over this interval. The process here employs a generalization of this approach and, if the trend terms are not satisfactory 309, allows both multiple trends and split trends 311, with the choice of trends again based on a statistical criterion like the BIC. A final system of equations is produced 317.

Fourth, while the notation and discussion has referred consistently to deposit rates and deposit balances, the process may be extended also to assets 313. Thus, deposits and loans (or bonds) can be examined in an analogous manner 315. This utilizes two modifications to the above discussion. One is the explicit consideration of three additional blocks, one for total assets (A), one for survey assets (B), and one for the interest rates on those assets (C); the other is to consider the implications of levels versus the changes in those assets. On the additional blocks, total assets are allowed to influence asset rates but not survey assets; survey assets may influence both asset rates and total assets; and asset rates may influence both total assets and survey assets. In addition, asset rates may influence deposit rates and vice-versa while survey assets do not influence survey deposits (or the reverse) at least directly and generally total assets do not influence total deposits (or the reverse) again at least directly. The first set of restrictions are identical to those for deposits. The only additional consideration when dealing with assets rather than deposits concerns a technical issue of examining levels versus rates of change. When considering survey deposits, the analysis considers the level of deposits as a prelude to calculating the retention rate of survey deposit balances rather than focusing on the rate of change. When considering survey assets, for example, the outstanding survey balances of VISA cards, there is a question of whether it is more appropriate to consider the level of VISA balances or the change in the amount of those balances, that is, the amount paid off each month. Consistent with the approach to deposits, the process focuses on the level rather than the rate of change. The forecasting procedure, however, is robust enough to generate forecasts of balance payments if that was of interest to the financial institution. This modification also allows a breakdown of deposit categories into generally separate blocks, e.g., personal vs. business, where personal would refer to the vectors T, S and R mentioned earlier and business would refer to the vectors A, B and C. Thus, the three basic "building blocks" can be repeated and joined together as necessary, multiple times as necessary.

Part Four

Figure 4:
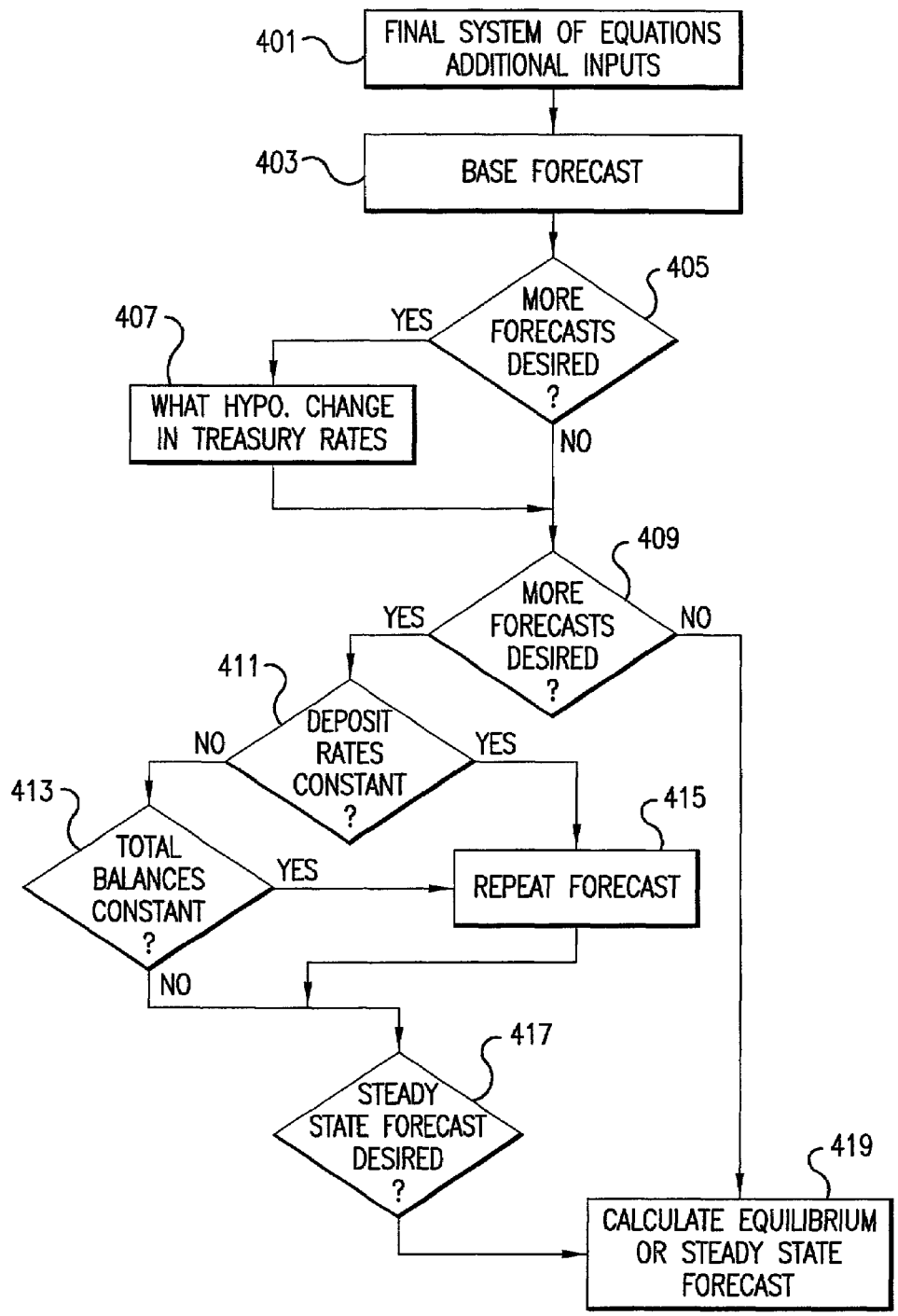
FIG. 4 is a flow chart illustrating forecasting procedure.

Reference is made to FIG. 4. The forecasting itself is based on the simultaneously estimated system of equations 317 from a subset VAR and their repeated use. That is, there are a system of equations such as (1) above, each explaining a single variable in one of the vectors for total balances, survey balances or deposit rates. Considering a simple two-variable and one lag analog, the equation system could be written as:

$$Y_t = \beta_0 + \beta_1 Y_{t-1} + \beta_2 X_{t-1}$$

and $$X_t = \delta_0 + \delta_1 X_{t-1} + \delta_2 Y_{t-1}. \quad (2)$$

where
Y=first endogenous variable,
X=second endogenous variable,
t=time.

and where the β's and δ's again are parameters obtained by regression.

These two equations can be used to forecast Y and X as far into the future as desired. That is, knowing the values or having forecasted the values of $Y_0$ and $X_0$, forecasts of $Y_1$ and $X_1$ can be obtained and these forecasts can then be employed to generate forecasts of $Y_2$, $X_2$, $Y_3$, $X_3$, . . . This process serves as the basis for the forecasting approach employed here and this "bootstrapping" approach is employed whenever VAR analysis is employed for forecasting 401.

While this basic approach is well known, there are a number of specific assumptions that are made to implement the forecast process.

The first assumption concerns the treatment of the so-called external (exogenous) variables. That is, some variables such as market interest rates and Treasury interest rates are taken as given by the financial institution. However, to implement the forecasting process as described by (2) above, it is necessary to have future values (or forecasts) for these variables as well. Generating those forecasts is two part. Treasury rates are forecast first. The standard initial "forecast" is to simply assume they will remain unchanged. However, the process allows the institution to define specific hypothetical changes or to forecast Treasury rates also using a VAR model. For other exogenous variables, for example, local market interest rates, they are related (regressed) on Treasury rates and their own lags again using a VAR and the BIC including a maximum of two lags (although all those specifications can be modified in conjunction with the discussion in Part Three). The resulting equations together with the Treasury rate forecasts are employed to forecast these variables as far into the future as desired, again employing the process described by (2) above.

The second assumption concerns the forecast horizon. There is no theoretically "correct" forecast horizon. From the financial institution's perspective, the appropriate question is what is the application of the forecast? The answer to that question normally determines the appropriate horizon. To allow the forecasts generated here to be employed in a wide range of advantageous applications, the process allows the institution to specify two different horizons. One is a monthly horizon; for how many individual months in the future does the institution want monthly forecasts? The other is a yearly forecast; that is, how far into the future does the institution want end-of-year value forecasts? The procedure is general and allows virtually any forecast horizon. However, the standard horizons chosen tend to be one or two years of monthly forecasts and 15 to 20 years of yearly forecasts.

These two assumptions are sufficient to yield a "base" forecast 403. That is, given constant Treasury rates, the process determines what will happen to total deposits, survey deposits and deposit rates over the institution-defined horizon. In addition, the forecasts of survey deposits are used to calculate so-called retention rates. Retention rates are the calculated ratio of forecasted survey balances in some future period t+k relative to survey balances in the most recent period t. This ratio is a key input into determining the value of account balances as described in the subsequent section.

Beyond these two assumptions, however, the process also allows the financial institution three additional choices 405. The first relates to an option to specify alternatives to the "base" forecast, e.g., to consider what happens in cases where interest rates do not remain constant. Specifically, regulators of financial institutions as well as the institutions themselves typically are concerned with what will happen in periods of changing interest rates. One of the weaknesses of most prior models of retention rates, for example, is that they do not allow changing interest rates to have any impact on retention rates, although clearly they could have a major impact. Thus, it is important to have forecasts for other rate assumptions beyond the base case, to demonstrate any rate related behavior sensitivity.

The process allows three different approaches to the generation of those additional forecasts based on different patterns of Treasury rate behaviors 407. The first is what is referred to as the standard regulatory approach. That is, Treasury rates are increased or decreased by a fixed amount, e.g. 100, 200 or 300 basis points, and then the estimated equations are employed using as inputs those higher or lower Treasury rates. This approach is called the standard regulatory approach because it follows the approach typically employed by regulators is assessing interest rate risk of assuming that rates increase (or decrease) immediately by a given amount and then remain at their higher (or lower) values for the indefinite future. The second approach to generating these additional forecasts assumes instead that Treasury rates increase as in the first approach by some fixed amount but do it over a user-defined interval. That is, rather than assuming that interest rates increase immediately by 100 basis points, it would allow interest rates to increase over the next year by 100 basis points. This approach is labeled the Ramp approach or forecast. The third approach to generating these additional forecasts allows user-defined changes in Treasury rates, and then calculates how other variables change as described above.

The second choice allowed is to determine what variables—or what blocks of variables—will be allowed to vary in the forecast 409. The base case allows all variables to vary freely depending on the specified equations. There are provided at least two alternatives to this full model forecast 411, 413. The first alternative is called "balances constant 413." In this case, all total balances are constrained to remain constant at their last observed value. The focus in this case typically is on the deposit rates with the question of how do deposit rates have to change with a given change in Treasury (and thus market) rates in order to maintain deposit balances. The other alternative is analogous and is called "rates constant 411." Here, deposit rates are constrained to remain constant at their last observed value. In this scenario the focus typically is on what would happen to deposit balances if the financial institution did not alter rates, especially in the face of changing market rates.

The third choice allowed considers the type of forecast generated, dynamic or steady-state 417. The base case considers the dynamic forecast and simply uses the most recent values, i.e. those available at time 0, to forecast the next period values, say at time 1, which are in turn used to forecast values in the subsequent period. The advantage to this approach is that it yields real-time forecasts based on the actual values and the history of the variables being forecast. The disadvantage, however, is that in some cases it may be sensitive to outliers or unusual observations in the last period or two of the sample. That is, if in the last observation period there was a dramatic decrease in checking account balances, for example, the forecasts based on that may view that decrease as a permanent change and may extrapolate that into continuing decreases in the future. (This situation is not a common outcome, but cannot be ruled out on theoretical grounds and depends on other statistical properties of the estimation process, specifically, is the dependent variable a random walk or close to a random walk.) Thus, a check on the process is to calculate the steady-state or long-run forecast values as well. That is, considering equation (2) above, if Y were constant over time, what would it imply? Other things equal, then $Y_t = Y_{t-1}$ and the first of the two relations can be solved for Y:

$$Y = (\beta_0 + \beta_2 X_{t-1})/(1-\beta_1). \quad (3)$$

where
  X=exogenous variable
  Y=variable
  β=potential parameters

This would be the steady state value of Y. Clearly as other variables in the X vector change over time, e.g. as Treasury rates change, the equilibrium value of Y also would change. However, Y would no longer be dependent on its own history in terms of the solution procedure for the forecasting approach. Thus, the equilibrium or steady state forecast can be calculated 419. This approach to forecasting is viewed as a supplement to the basic dynamic approach to forecasting typically employed both here and elsewhere.

Part Five

Figure 5:
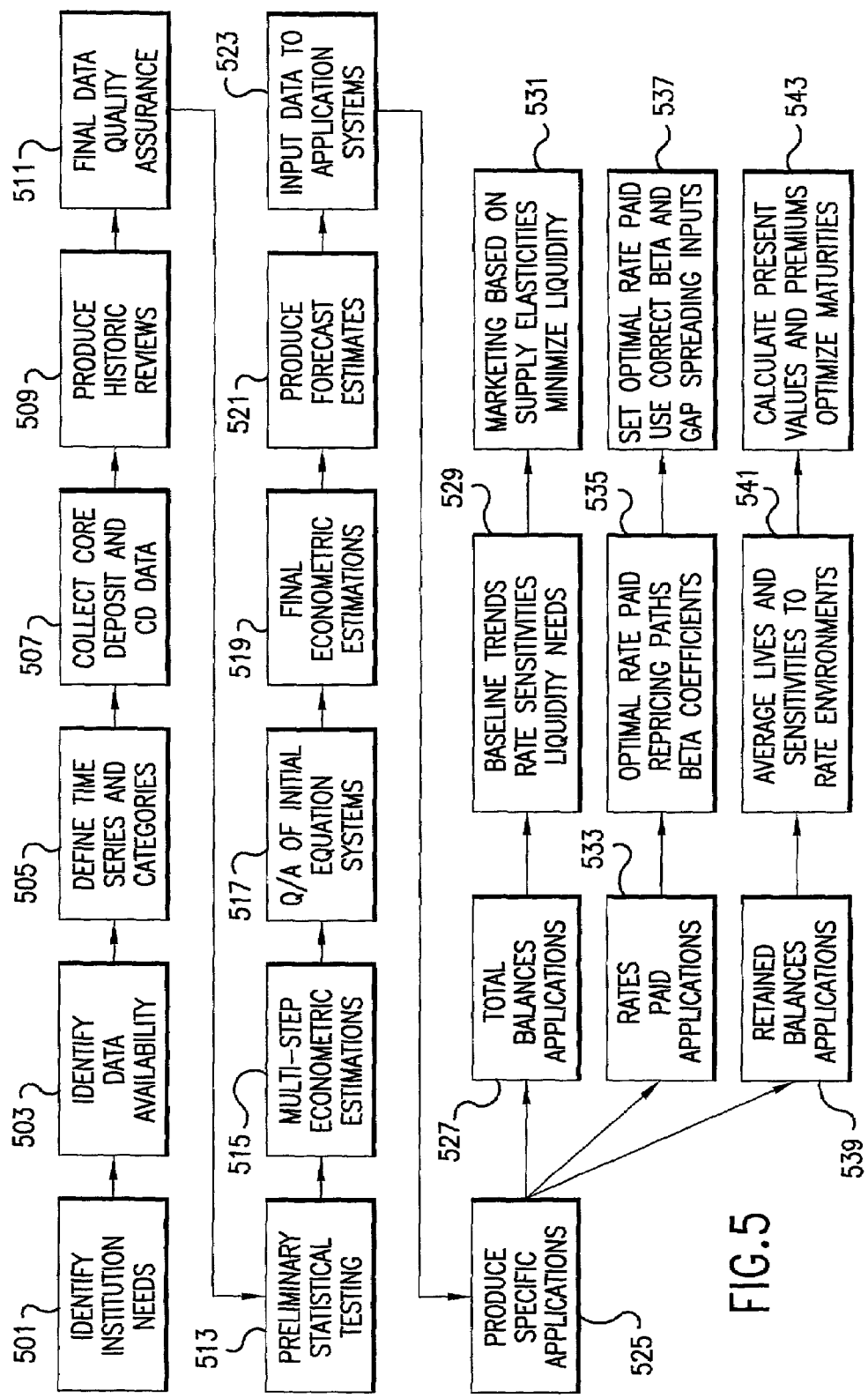
FIG. 5 is a production schematic of MPS core deposits and CD behavior reports.

Once the forecasts have been generated, they are loaded into a conventional spreadsheet in the usual manner for further analysis, in particular, for use in calculating base case (no change in Treasury rates) and alternate rate scenario estimates of behavior and the value of deposits. Reference is made to FIG. 5, illustrating the entire process beginning with data assembly (501 to 511), basic estimation (513 to 519), forecasting (521-523), and production (525-543). Steps 501 to 523 are discussed in more detail below.

At step 501, institutional needs are identified. At step 503, data availability is identified. At step 505, time series and categories are identified. At step 507, core deposit and CD data are collected. At step 509, historic reviews are produced. At step 511, final data quality assurance is performed.

Preliminary statistical testing is performed at step 513, and multi-step econometric estimations are performed at step 515. A quality analysis of initial equation system is done at step 517, and at step 519, final econometric estimations are done. At step 521, forecast estimates are produced. At step 523, data is input to application systems. At step 525, the system produces specific applications.

Steps 527 to 531 concern the total balances application, which considers baseline trend data, rate sensitivity data, and liquidity needs. At step 529, a base case (no change in future interest rates) forecast of total balances is produced first, using the system of simultaneous equations from the econometric estimations. The forecast, normally done for 24 individual future month end periods, provides insights into the baseline total balances "momentum" in a deposit category—Is it flat (no change), increasing, or decreasing? This assists managers in quantitatively determining funding and liquidity needs if interest rates stay generally constant.

At step 531, forecasts of total balances by time period are also conducted for hypothetical situations where interest rates rise or decline in the future (multiple choices of specific future interest rate paths can be accommodated). Indicated changes in the supply of category total balances across interest rate scenarios provide managers with measurements of the supply elasticity of category total balances (upon which pricing decisions can be based) and liquidity management insights.

In the alternate interest rate scenario forecast, total balances of other deposit categories, category own rate paid (if a rate bearing category), own rates paid on other categories, competitor rates paid, and all other forecast influences are adjusted along with the defined interest rate changes. Thus multiple influences contribute to future forecast values that are fully comprehensive and simultaneously determined by all relevant factors.

Steps 533 to 537 concern the rates paid applications, which take into consideration the optimal rate paid, repricing paths, and Beta coefficients. At step 535, a base case (no change in future interest rates) forecast of the institution's own rate paid is produced first, using the system of simultaneous equations from the econometric estimations. The forecast, normally done for 24 individual future month end periods and for annual year end periods out to 20 years, provides estimates of the institution's expected rates paid if historic pricing behaviors were applied to current interest rate levels. Current rate paid may be equal to, above (rich to history) or below (cheap to history) the estimated future rate paid. Knowing this relationship assists managers in setting optional rates paid at step 537 and thus in optimally managing interest expense.

Forecasts of own rate paid by time period are also conducted for hypothetical situations where interest rates rise or decline in the future (multiple choices of specific future interest rare paths can be accommodated). Indicated changes in category own rate paid across interest rate scenarios provide managers with measurements of the historic repricing behavior of the category. This offers guidance in repricing decisions and is the source for quantified beta (repricing speed) coefficients and specific repricing lag matrix inputs in ALM (asset-liability management) models.

In the alternate interest rate scenario forecasts, category own rate paid (if a rate bearing category), own rates paid on other categories, total balances of other deposit categories, competitor rates paid, and all other forecast influences are adjusted along with the defined interest rate changes. Thus multiple influences contribute to future forecast values that are fully comprehensive and simultaneously determined by all relevant factors.

Steps 539 to 543 concern the retained balances applications, in which average lives and sensitivity to rate environments are considered. At step 539, a base case (no change in future interest rates) forecast of the institution's retention of existing balances is produced first, using the system of simultaneous equations from the econometric estimations. The forecast, normally done for 24 individual future month end periods and for annual year end period values out to 20 years, provides estimates of the category's expected retained balances behaviors if historic tendencies are projected at current interest rate levels. This provides quantitative insights into the baseline retention "momentum" in a deposit category—Is it flat (no change), decreasing, or (in some cases) increasing? This assists managers in quantitatively calculating run off patterns (run off being the difference in retention from period to period). The run off data are used in the calculation of average lives, present values, and premiums (book value-present value), step 543.

Forecasts of retained balances behaviors by time period are also conducted for hypothetical situations where interest rates rise or decline in the future (multiple choices of specific future interest rate paths can be accommodated). Indicated changes in retained balance behaviors across interest rate scenarios provide managers with specific measurements of the rate sensitivity of retention behavior. This information is the source for quantifying category average lives, present values, premiums, and associated inputs for use, e.g., in ALM models. The indicated changes in category average lives, etc., as interest rates vary (i.e., their sensitivity to rate changes) provides a quantified measure of the convexity of the category's value.

In the alternate interest rate scenario forecast, retained balances of other categories, own category rate paid (if a rate bearing category), own rates paid on other categories, total balances of other deposit categories, competitor rates paid, and all other forecast influences are adjusted along with the defined interest rate changes. Thus multiple influences contribute to future forecast values that are fully comprehensive and simultaneously determined by all relevant factors.

The invention may also be applied to other financial assets or liabilities that are characterized by indeterminate behavior. These financial assets include, for example, CD's, VISA balances outstanding, international funding categories, etc.

The most highly preferred embodiment of the invention is in connection with core deposits. Nevertheless, the invention encompasses financial assets and financial liabilities, and is intended to reach any form of financial instruments.

While the preferred mode and best mode for carrying out the invention have been described, those familiar with the art to which this invention relates will appreciate that various alternative designs and embodiments for practicing the invention are possible, and will fall within the scope of the following claims.

What is claimed is:

1. A method for determining a useful life of balance sheet items, comprising the steps of:
   (A) receiving data for each of a plurality of balance sheet items, the data including a sample of account balances, a size of the sample being $n=4k^2s^2/d^2$ wherein s is an estimated yearly retention rate, d is in the range of 0.01 to 0.03 and k corresponds to a level of significance;
   (B) performing, in a computerized system, a dynamic calculation of a first retention rate for each of a plurality of balance sheet items using the data received in step (A);
   (C) performing, in the computerized system, a steady-state calculation of a second retention rate for the plurality of balance sheet items using the data received in step (A);
   (D) combining said first and second retention rate to determine a predicted useful life of the combined plurality of balance sheet items; and
   (E) outputting the predicted useful life.

2. The method of claim 1, further comprising the step of selecting one of a plurality of variables affecting at least one of the retention rates.

3. The method of claim 2, further comprising the step of determining a sensitivity of balance sheet item variables to other deposit variables.

4. The method of claim 1, further comprising the step of forecasting scenarios extrapolated from said retention rate.

5. The method of claim 1, wherein the data for each of the plurality of deposits includes total deposit balances, deposit rates, and a sample of account balances.

6. The method of claim 1, wherein a length of the sample is four years.

7. The method of claim 1, wherein k is 1.96.

8. The method of claim 1, further comprising the step of checking for outliers in the plurality of balance sheet items.

9. The method of claim 1, further comprising the step of including exogenous variables in at least one of the calculations.

10. The method of claim 9, wherein the exogenous variables are selected from the set of seasonal variables, day-of-the-month variables, treasury interest rates, interest rates, local unemployment rate, local personal income, and local retail sales.

11. The method of claim 1, further comprising the step of including interest rate spread in at least one of the calculations.

12. The method of claim 3, wherein the step of forecasting scenarios includes providing future values for use in at least one of the calculations.

13. The method of claim 12, wherein the future values are selected from the set of forecast treasury rates, forecast horizon, forecast deposits, forecast retention rates, and forecast interest rates.

14. The method for determining a useful life of balance sheet items comprising the steps of:
   (A) performing, in a computerized system, a dynamic calculation of a first retention rate for each of the plurality of balance sheet items;
   (B) performing, in the computerized system, a stead-state calculation of a second retention rate for the plurality of balance sheet items;
   (C) combining said first and second retention rate to determine a predicted useful life of the combined plurality of balance sheet items;
   (D) selecting one of a plurality of variables affecting at least one of the retention rates;
   (E) determining a sensitivity of the selected variable to other balance sheet item variables;
   (F) forecasting scenarios extrapolated from said retention rate, wherein the step of forecasting scenarios includes providing future values for use in at least one of the calculations, and wherein the future values are selected from the set of forecast treasury rates, forecast horizon, forecast balance sheet items, forecast retention rates, and forecast interest rates;
   (G) wherein the balance sheet items include deposits and financial instruments;
   (H) wherein the data for each of the plurality of financial assets includes total balances, interest rates, and a sample of account balances, wherein a length of the sample is four years, wherein a size of a sample is $n=4k^2s^2/d^2$, and wherein s is an estimated yearly retention rate, d is in the range of 0.01 to 0.03, and k corresponds to a level of significance;
   (I) checking for outliers in the plurality of balance sheet items;
   (J) including exogenous variables in at least one of the calculations, wherein the exogenous variables are selected from the set of seasonal variables, day-of-the-month variables, treasury interest rates, interest rates, local unemployment rate, local personal income, and local retail sales;
   (K) including interest rate spread in at least one of the calculations; and (L) outputting the predicted useful life of the combined plurality of balance sheet items.

15. A computerized system for determining a useful life of balance sheet items, comprising:
(A) receiving means for receiving data for each of a plurality of balance sheet items, the data including a sample of account balances, a size of the sample being $n=4k^2s^2/d^2$ wherein s is an estimated yearly retention rate, d is in the range of 0.01 to 0.03 and k corresponds to a level of significance;
(B) means for dynamically calculating a first retention rate for each of the plurality of balance sheet items using the data received by the receiving means;
(C) means for calculating a steady-state second retention rate for the plurality of balance sheet items using the data receiving by the receiving means;
(D) means for combining the first and second retention rates to determine a predicted useful life of the combined plurality of balance sheet items; and means for outputting the predicted useful life.

16. The system of claim 15, wherein at least one of the retention rates is affected by one of a plurality of balance sheet item variables.

17. The system of claim 16, further comprising a means for determining a sensitivity of one of the balance sheet item variables to other balance sheet item variables.

18. The system of claim 15, further comprising means for extrapolating a forecast scenario from said retention rate.

19. The system of claim 15, wherein the balance sheet items include financial instruments.

20. The system of claim 15, wherein the data for each of a plurality of balance sheet items includes total balances, interest rates, and a sample of account balances.

21. The system of claim 15, wherein a length of the sample is four years.

22. The system of claim 15, further comprising means for identifying outliers in the plurality of balance sheet items.

23. The system of claim 15, wherein exogenous variables are included in at least one of the calculations.

24. The system of claim 23, wherein the exogenous variables are selected from the set of seasonal variables, day-of-the-month variables, treasury rates, interest rates, local unemployment rate, local personal incomes, and local retail sales.

25. The system of claim 15, wherein an interest rate spread is included in at least one of the calculations.

26. The system of claim 17, wherein the forecast scenario is based on a future value for use in at least one of the calculations.

27. The system of claim 26, wherein the future values are selected from the set of forecast treasury rates, forecast horizon, forecast balance sheet items, forecast retention rates, and forecast interest rates.

28. The system of claim 15, comprising a display of the predicted useful life of the combined plurality of balance sheet items.

29. A computerized system for determining a useful life of balance sheet items, comprising:
(A) means for dynamically calculating a first retention rate for each of a plurality of balance sheet items;
(B) a steady-state means for calculating second a retention rate for the plurality of balance sheet items;
(C) means for combining the first and second retention rates, to determine a predicted useful life of the combined plurality of balance sheet items;
(D) means for determining a sensitivity of a balance sheet item variable that affects at least one of the retention rates to other balance sheet item variables;
(E) means for extrapolating a forecast scenario from said retention rate, wherein the forecast scenario includes future values for use in at least one of the calculations, and wherein the future values are selected from the set of forecast treasury rates, forecast horizon, forecast deposits, forecast retention rates, and forecast interest rates; and
(F) means for outputting the predicted useful life of the combined plurality of financial assets;
(G) wherein the data for each of the plurality of balance sheet items used for calculating the first and second retention rates includes total balances, interest rates, and a sample of account balances, wherein a length of the sample is four years, wherein a size of a sample is $n=4k^2s^2/d^2$, and wherein s is an estimated yearly retention rate, d is in the range of 0.01 to 0.03, and k corresponds to a level of significance;
(H) wherein outliers are identified in the plurality of financial assets;
(I) wherein exogenous variables are included in at least one of the calculations, the exogenous variables being selected from the set of seasonal variables, day-of-the-month variables, treasury rates, interest rates, local unemployment rate, local personal income, and local retail sales; and
(J) wherein an interest rate spread is included in at least one of the calculations.

30. The method of claim 14, wherein k is 1.96.

31. The system of claim 15, wherein k is 1.96.

32. The computerized system of claim 29, wherein k is 1.96.

33. The method of claim 1, wherein the balance sheet items comprise financial assets and financial liabilities.

* * * * *